(12) United States Patent
Roskowski

(10) Patent No.: US 8,194,174 B2
(45) Date of Patent: Jun. 5, 2012

(54) INTERNET-BASED CAMERA FOCUSING METHOD AND APPARATUS

(75) Inventor: Steven Goddard Roskowski, Los Gatos, CA (US)

(73) Assignee: Third Iris Corp., Grand Cayman (KY)

( * ) Notice: Subject to any disclaimer, the term of this patent is extended or adjusted under 35 U.S.C. 154(b) by 391 days.

(21) Appl. No.: 12/511,822

(22) Filed: Jul. 29, 2009

(65) Prior Publication Data

US 2010/0220202 A1    Sep. 2, 2010

Related U.S. Application Data

(63) Continuation-in-part of application No. 12/395,437, filed on Feb. 27, 2009.

(51) Int. Cl.
*H04N 5/232* (2006.01)
*H04N 7/18* (2006.01)
*H04N 5/222* (2006.01)
*G03B 13/18* (2006.01)

(52) U.S. Cl. .................... 348/346; 348/333.04; 348/159

(58) Field of Classification Search .................... 348/62, 348/148, 159, 211.3, 211.14, 333.02, 333.04, 348/345, 346
See application file for complete search history.

(56) References Cited

U.S. PATENT DOCUMENTS

| | | | | |
|---|---|---|---|---|
| 4,264,160 A | * | 4/1981 | Aoki | 396/127 |
| 4,319,238 A | * | 3/1982 | Ogasawara et al. | 345/38 |
| 4,586,090 A | * | 4/1986 | Wilman et al. | 358/406 |
| 4,794,459 A | * | 12/1988 | Moberg et al. | 348/346 |
| 5,506,654 A | * | 4/1996 | Kim | 396/147 |
| 6,937,284 B1 | * | 8/2005 | Singh et al. | 348/346 |
| 7,248,301 B2 | * | 7/2007 | Voss et al. | 348/346 |
| 7,469,097 B2 | * | 12/2008 | Yost et al. | 396/77 |
| 7,689,112 B2 | * | 3/2010 | Sasaki | 396/147 |
| 7,796,183 B2 | * | 9/2010 | Hagino | 348/346 |
| 7,796,829 B2 | * | 9/2010 | Nguyen et al. | 382/260 |
| 7,877,006 B2 | * | 1/2011 | Moriya | 396/147 |
| 8,081,227 B1 | * | 12/2011 | Kim et al. | 348/211.3 |
| 2005/0271373 A1 | * | 12/2005 | Tomita | 396/103 |
| 2007/0216796 A1 | * | 9/2007 | Lenel et al. | 348/345 |
| 2012/0026378 A1 | * | 2/2012 | Pang et al. | 348/333.02 |

* cited by examiner

*Primary Examiner* — John Villecco
(74) *Attorney, Agent, or Firm* — Patentry

(57) ABSTRACT

An Internet based camera providing cost-effective higher security and easier and quicker installation by internally determining a degree of quality measure and providing low latency feedback to the installer on adjusting focus.

17 Claims, 10 Drawing Sheets

Establish a first client session with the server, report camera status, receive focus command Trigger indicator cueing adjustment.

Pass images into the focus engine for processing by a high pass filter.

Operate on each image before and after the high pass filter, determine a degree of quality measure, store in the current focus store, record highest value in the best seen focus store.

While each new current focus store value is an improvement over previous current focus store, Keep indicator on, Else turn indicator off.

When value of the current focus store is within a certain range of the best seen focus store, trigger indicator to stop adjusting, wait a period Terminate the first session, initiate a second session, report status of the focus command.

FIG.9

INTERNET-BASED CAMERA FOCUSING METHOD AND APPARATUS

CROSS-REFERENCE TO RELATED PATENT APPLICATIONS

This application is a CIP of Ser. No. 12/395,437 filed Feb. 27, 2009 Pat. No. 2009/0219392 issued September 2009 by the present inventor which is incorporated by reference.

BACKGROUND

It is the observation of the inventors that conventional video surveillance cameras are difficult to install and thus uneconomical for many user segments. There are many advantages to Internet-service-based cameras using the Internet protocol for transport and a centralized, managed facility for storage and processing, however the task of focusing a camera is painful in a high latency scenario. Each adjustment may require five to 10 seconds to determine its effect. The inherent delay may cause overanxious installers to overshoot and diverge rather than converge toward a solution. Conventional cameras attempt to solve this by either providing an analog port out the back of the camera for a technician to attach a specialized display or by providing for local network access such as connecting a portable personal computer. Either solution creates undesirable costs and complexity and an unnecessary security vulnerability.

Security cameras are increasingly important for both enterprises and consumers. All levels of government are promoting installation of cameras to address fears of crime. Liability insurers may raise rates on clients who cannot document that their premises are controlled. But the market is bifurcated into extremely costly high end integrated services and low cost do-it-yourself system design projects for hobbyists. By high complexity image sequences the present invention includes high resolution digital photographs, lower resolution moving images in the form of a series of video frames, meta-data about the time, place, and conditions of the image, and derived data from quantitative metrics of the images and compressed low resolution extracts from images.

Internet Protocol (IP) network digital cameras are known as an accepted solution for security and monitoring. Utilizing IP networks instead of dedicated video connections to a local server dramatically improves system flexibility and can reduce connectivity and management complexity.

In particular it can be appreciated that what is needed is a low-cost and easily installed camera with improved security and quality of image coupled to a server on the network but which can be focused while avoiding issues due to high latency during installation.

BRIEF DESCRIPTION OF DRAWINGS

FIG. 9 is a flowchart.

SUMMARY

Figure 1:
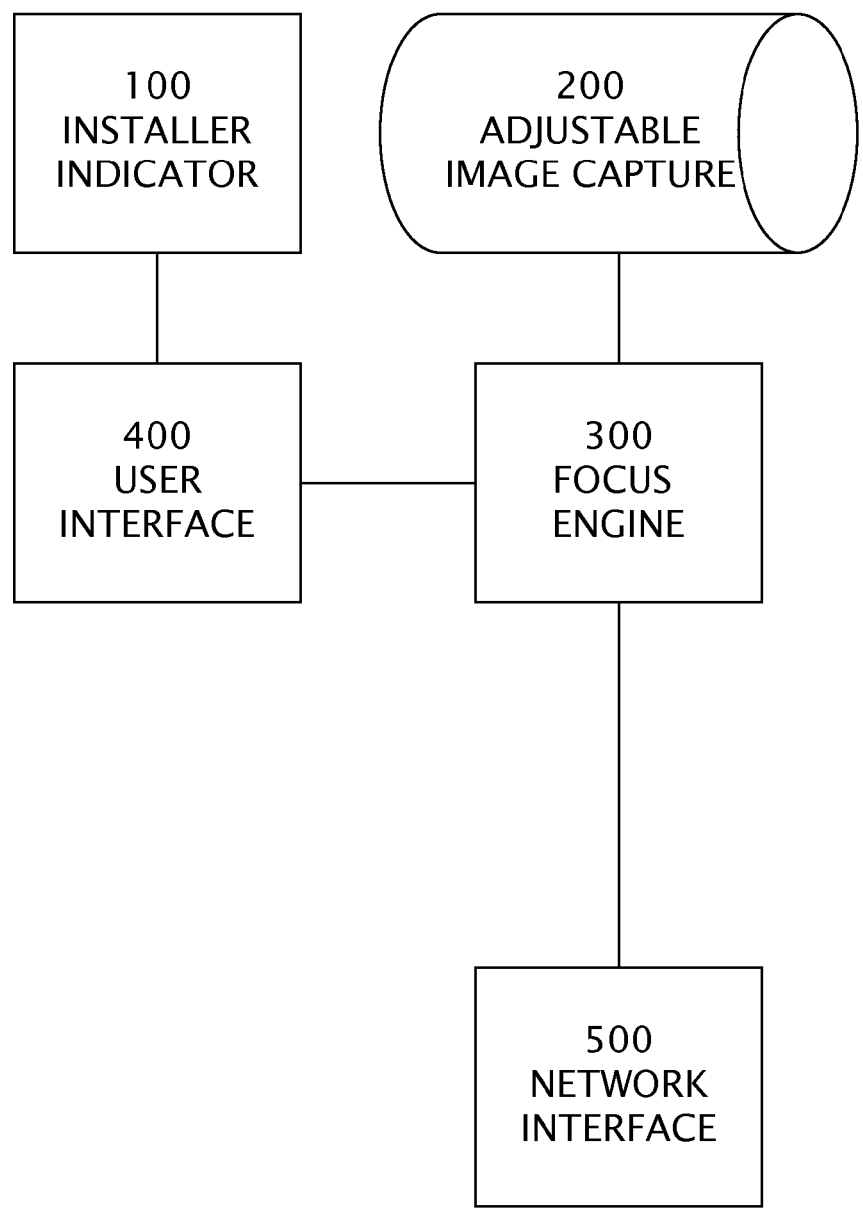
FIG. 1 is a block diagram.

A point of recordation terminal previously disclosed comprises circuits for communication, analysis, and capture of digital images. The present CIP patent application further discloses the Internet based digital camera used in an embodiment of the point of recordation terminal. More specifically, the present patent application discloses the camera's digital image capture device and circuits to enable quick and efficient installation and focusing without instrumentation to view the images captured by the camera. Focusing is accomplished without the latency of transferring images from the camera to the server. The camera does not allow local access to the encrypted images thereby lowering costs, increasing security, and increasing the speed of installation. A high pass filter detects the sharpness of edges and a comparison circuit determines a degree of quality measure by comparing the filtered and unfiltered images. An installer is cued by the camera to adjust the digital image capture device according to at least one indicator built into the camera. In an embodiment the focusing process is initialized when the server responds to a client request from the camera. In other embodiments, focusing can be initialized without connectivity to a server. A mechanism for restarting the focus process directly from the camera which does not require additional circuits is described.

DETAILED DESCRIPTION OF EMBODIMENTS

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

In an embodiment, a method for operating an Internet-service-based camera comprises the following steps:
cueing an installer through an indicator that the focus process has begun and installer should adjust focus,
cueing an installer through an indicator to stop adjusting focus, or if sufficient focus was not achieved because installer passed through focus point, repeating the above adjustments, and
concluding a first client session and initiating a second client session comprising transmitting a camera status and a status on the command to focus the camera received in the first client session.

In an embodiment, the method further comprises
establishing a first client session with a server through a network interface coupled to a public wide area network,
transmitting camera status and receiving a command to enter the focus mode.

In an embodiment, the method comprises the step of enabling the focus mode by one of depressing a button on the side of the camera, a button on a local website, a user entered command on a port, and a pattern presented to the camera. Means for enabling the focus mode could be a mechanical, optical, electronic, magnetic, or radio frequency switch or pattern recognition circuit.

In an embodiment the method further comprises cueing an installer through an indicator substantially each time a degree of quality measurement of a later frame is substantially improved over an earlier frame.

In an embodiment cueing an installer comprises one of
  an audio tone with frequency associated with the relative quality of focus,
  an audio tone with frequency associated with whether within tolerance of best focus,
  a sequence of audio tones with repetition associated with relative quality of focus, and
  a unique audio indicator.

In an embodiment cueing an installer comprises one of
  illuminating at least one visual indicator when focus is within tolerance of best focus,
  illuminating one of multiple visual indicators when focus is within a specific threshold associated with the specific indicator,
  blinking at least one indicator at a rate of speed associated with the relative quality of focus,
  adjusting degree of illumination of an indicator at level relative to the quality of focus
  illuminating a visual indicator in a certain pattern.

In an embodiment the method further comprises the step of zeroing stored values upon reception of an event.

In an embodiment an event is determined by a command received from server.

In an embodiment an event is determined by an indication from installer consisting of
  pressing button on camera.

In an embodiment an event is determined by an indication from installer consisting of
  shading lens sufficient to cause sequence of abnormally dark frames.

In an embodiment an Internet-based camera apparatus comprises
  a network interface whereby a client session may be established with a server to transmit status and request commands,
  at least one output indicator whereby an installer may be cued to perform an action,
  a user interface driver circuit coupled to at least one output indicator and further coupled to a focus engine circuit,
  the focus engine circuit coupled to
  a digital image capture device and further coupled to the network interface and to the user interface driver circuit,
  wherein a focus engine circuit comprises
    a comparison means,
    an image summing means, and
    a high pass filter.

In an embodiment an Internet-based camera apparatus further comprises
  a circuit or processor adapted to determine a current focus is within 5% of the best seen focus and
  a circuit or processor adapted to determine a current focus is within 1% of the best seen focus.

In an embodiment an Internet-based camera apparatus further comprises a circuit or processor adapted to determine a degree of quality measurement.

In an embodiment, the means for determining a degree of quality measurement comprises a comparison circuit coupled to a current focus store and a best seen focus store,
  the comparison circuit further coupled to
  an original image summing circuit and to
  a high pass filter image summing circuit
whereby the maximum sharpness of edges is recorded in the best seen focus store.

Referring now to FIG. 1, the present invention comprises an apparatus comprising:
  an installer indicator device 100;
  an adjustable image capture device 200;
  a focus engine circuit 300;
  a user interface circuit 400; and
wherein the apparatus does not have a locally accessible port to view images, the focus engine circuit 300 coupled to the adjustable image capture device 200 and to the network interface 500,
the user interface circuit 400 coupled to the focus engine 300 and to the installer indicator device 100, whereby a human installer can perceive an indication of the degree of quality during the adjustment of the image capture device.

In an embodiment the apparatus further comprises a network interface 500, whereby the apparatus receives a focus command transmitted by a server coupled through a public network to the apparatus.

Figure 2:
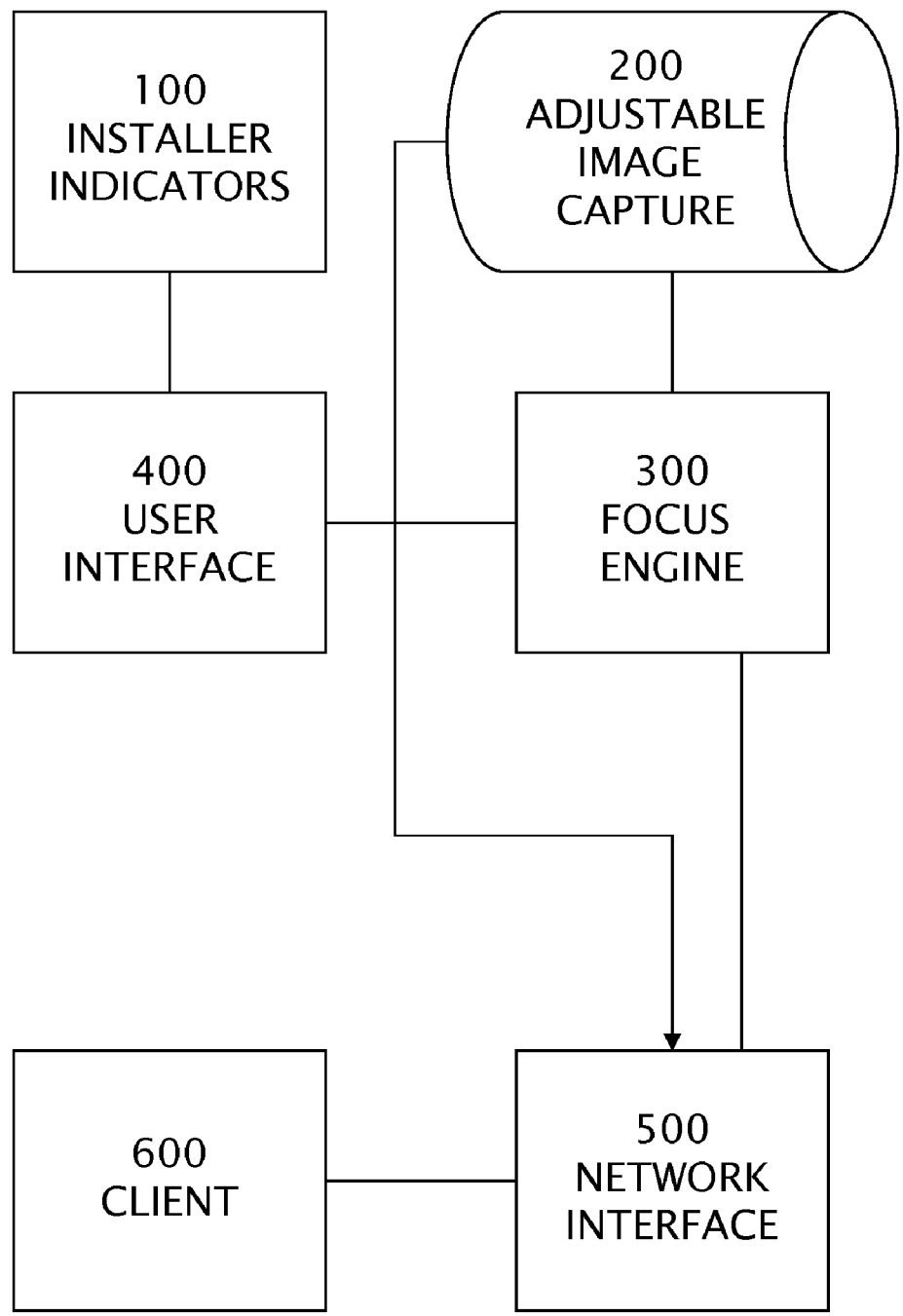
FIG. 2 is a block diagram.

Referring now to FIG. 2, in an embodiment the apparatus further comprises:
  a client circuit 600, coupled to the network interface 500, wherein the client circuit comprises a processor adapted
  to initiate a first hyper text transfer protocol connection to a server,
  to request a command and subsequently
  to terminate the first session and initiate a second session;
  coupled to the network interface 500 and coupled to the adjustable image capture device 200 whereby at least one image frame captured on the apparatus is transmitted through a public network to a server.

Figure 3:
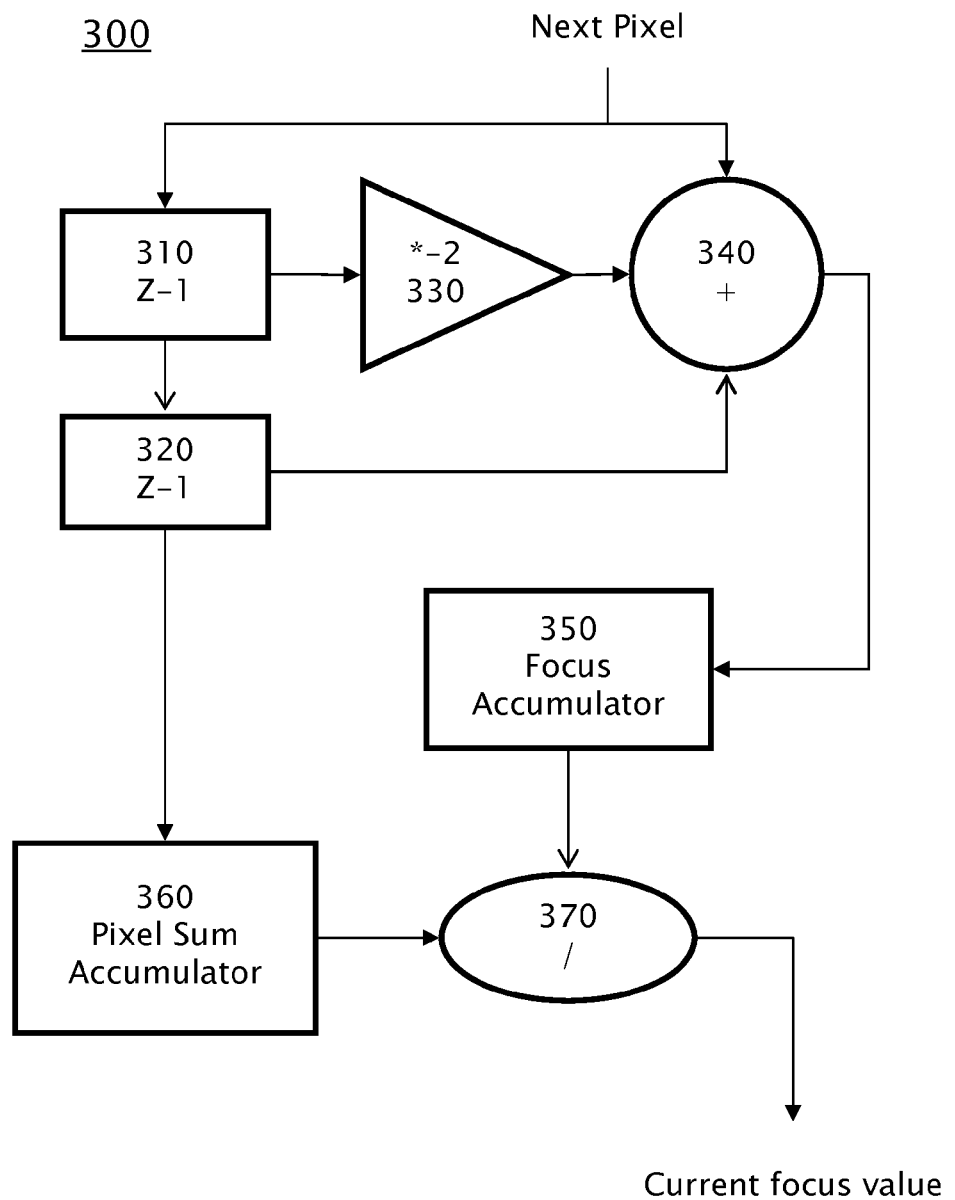
FIG. 3 is a flowchart.

Referring now to FIG. 3, in an embodiment the focus engine circuit 300 comprises a high pass filter, such as the following non-limiting example:
  a first delay device and a second delay device 310 and 320;
  a times negative two scaler circuit 330;
  a three input summer circuit 340;
  a focus accumulator circuit 350;
  a pixel sum accumulator circuit 360; and
  a ratio circuit 370,
the ratio circuit 370 coupled to the focus accumulator circuit 350 and the pixel sum accumulator circuit 360 for to determine a current focus value for each frame of the adjustable image capture device 200,
the first delay device 310 and the second day of delay device 320 coupled in series between the circuit input and the pixel sum accumulator circuit 360,
the times negative two scaler circuit 330 coupled between the first delay device 310 and the three input summer circuit 340,
the three input summer circuit 340 further coupled to the second delay device 320 and the circuit input and further coupled to the focus accumulator circuit 350
  whereby an image processing high pass filter is efficiently approximated, and a degree of quality measure is determined for each frame. The circuit is a simple but effective example of a high pass filter comprising a plurality of delay elements in series, a scaler and a summation circuit. The output of the high pass filter and the raw pixel values are each accumulated. The ratio of the high pass accumulation to the raw pixel accumulation provides an accurate measure of the relative focus of the image. Accordingly, the degree of quality measurement circuit comprises a ratio device to provide a focus value coupled to the output. The ratio device is coupled to a focus accumulator 350 as one input and a sum accumulator 360 as the second input. The sum accumulator is coupled to receive each pixel of a frame through a first delay element 310 in series with a second delay element 310. The focus accumulator is coupled to a summation circuit 340 to receive the output of the summation. The first delay element 310 output is coupled to the second delay element 320 which drives the sum accumulator and the summation circuit. The first delay element output is further coupled to a scaler 330 which also drives the summation circuit. The first delay element input is coupled to the circuit input which also drives the summation circuit. The circuit input receives each pixel of a video frame and is coupled to the summation circuit as an input and the first delay element as an input.

By windowing the pixels fed to the circuit, and resetting the circuit for each frame an effective focus engine is accomplished. More sophisticated circuits such as including additional feedback calculations or cascading filters, increase the discrimination or linearity of the high pass filter, which improve the usability of the solution but do not appreciably change the invention.

In an embodiment, the user interface circuit 400 is an audio tone generator and the installer indicator device 100 is an electrical connector coupled to a transducer wherein a transducer is one of a removable acoustical transducer and a permanently coupled acoustical transducer, whereby the degree of quality measure controls the pitch of a audio tone perceptible to the installer as an indication of current focus value.

Figure 4:
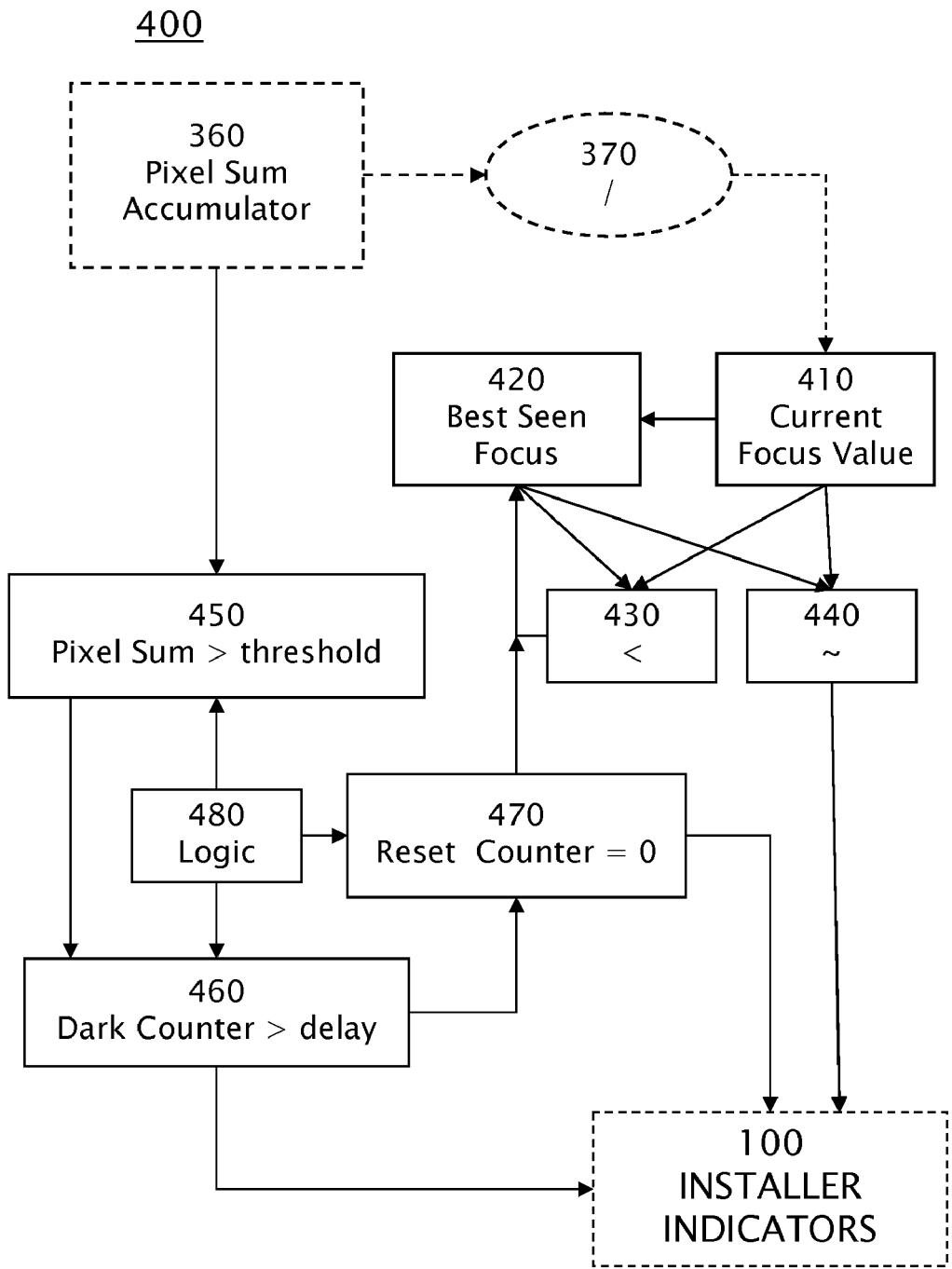
FIG. 4 is a flowchart.

Referring now to FIG. 4, in an embodiment, the installer indicator device 100 is at least one electrically operable visible output device, and the user interface circuit 400 comprises
    a current focus value store 410,
    a best seen focus store 420,
    a latch control 430, and
    an approximate equality circuit 440;
the approximate equality circuit 440 coupled to the current focus value store 410 and the best seen focus store 420, and further coupled to the installer indicator device 100, for to determine and display the condition that the current focus is within a range of the best seen focus,
the latch control 430 coupled to the current focus value store 410 and the best seen focus store 420, for to latch the current focus value into the best seen focus store 420 on the condition that the best seen focus is less than the current focus value, and the current focus value store coupled to the ratio device 370 for to receive a degree of quality measure for each frame.

In an embodiment, the installer indicator device 100 is a plurality of electrically operable visible output devices, and the approximate equality circuit for 440 comprises:
    a fine bit mask having at least one least significant bit,
    a gross bit mask having at least two significant bits, and
    logic circuits,
whereby the installer indicator device 100 displays a first state of the current focus value being within a range of the best seen focus and a second state of the current focus value being substantially equal to the best seen focus.

Referring now to FIG. 4, in an embodiment the apparatus further comprises means for initializing and reinitializing the focus mode of operation, a non-limiting example such as the following:
    a pixel sum comparator 450;
    a dark counter and comparator 460;
    a reset counter and comparator 470; and
    control logic circuits 480,
the pixel sum comparator 450 coupled to the pixel sum accumulator 360, and coupled to the dark counter and comparator 460, whereby the dark counter is enabled to count while the pixel sum is not above its threshold, and the dark counter is reinitialized while the pixel sum is above its threshold, the dark counter and comparator 460 further couples to an installer indicator device 100 and a reset counter and comparator 470, whereby an installer indicator device displays a reset state for a fixed period following initialization of the reset counter when the dark counter has detected a maximum delay, the reset counter is further coupled to the installer indicator device 100 and to the best seen focus store 420, for to clear the reset state display and to reinitialize the best seen focus store.

In an embodiment, at least one of the pixel sum threshold, the dark delay, the reset fixed, the fine bit mask, and the gross bit mask, are controlled by commands received through the network interface 500.

In an embodiment the encryption circuit comprises:
a private key encryption circuit wherein the private key is unique to each instance of the apparatus,
whereby each stored image is quantifiably substantiated to originate from an identified apparatus by a strong digital signature.

In an embodiment, the client circuit 600 comprises:
a processor adapted
to initiate a first hyper text transfer protocol post method connection to a server,
to transfer as least one video image transfer encoded in chunks,
to report status of the camera and of a previously received command, and
to terminate the first session and initiate a second session.

Referring now to FIG. 1, a block diagram of the apparatus illustrates the apparatus comprising an adjustable image capture device 200, coupled to a focus engine 300, the focus engine coupled to a network interface 500 whereby the apparatus establishes a client session, transmits status reports, and in an embodiment receives a focus command. The focus engine is further coupled to a user interface circuit 400. The user interface circuit is further coupled to installer indicators 100 which it controls to cue the installer to adjust the image capture device or to stop adjusting. As the image capture device is being adjusted, images are processed by a high pass filter within the focus engine to detect the sharpness of edges. A comparison engine compares the file input to the high pass filter with the file output from the high pass filter to determine a degree of quality measure which is stored in the current focus store. The highest value of the current focus store is written into the best seen focus store. The user interface circuit triggers an indicator to cue the installer to adjust the image capture device until it reaches a position wherein the current focus store is within a certain range of the best seen focus store. In an embodiment, the first client session is terminated. A second client session is initiated and the status of commands and the camera is reported to the server.

Figure 5:
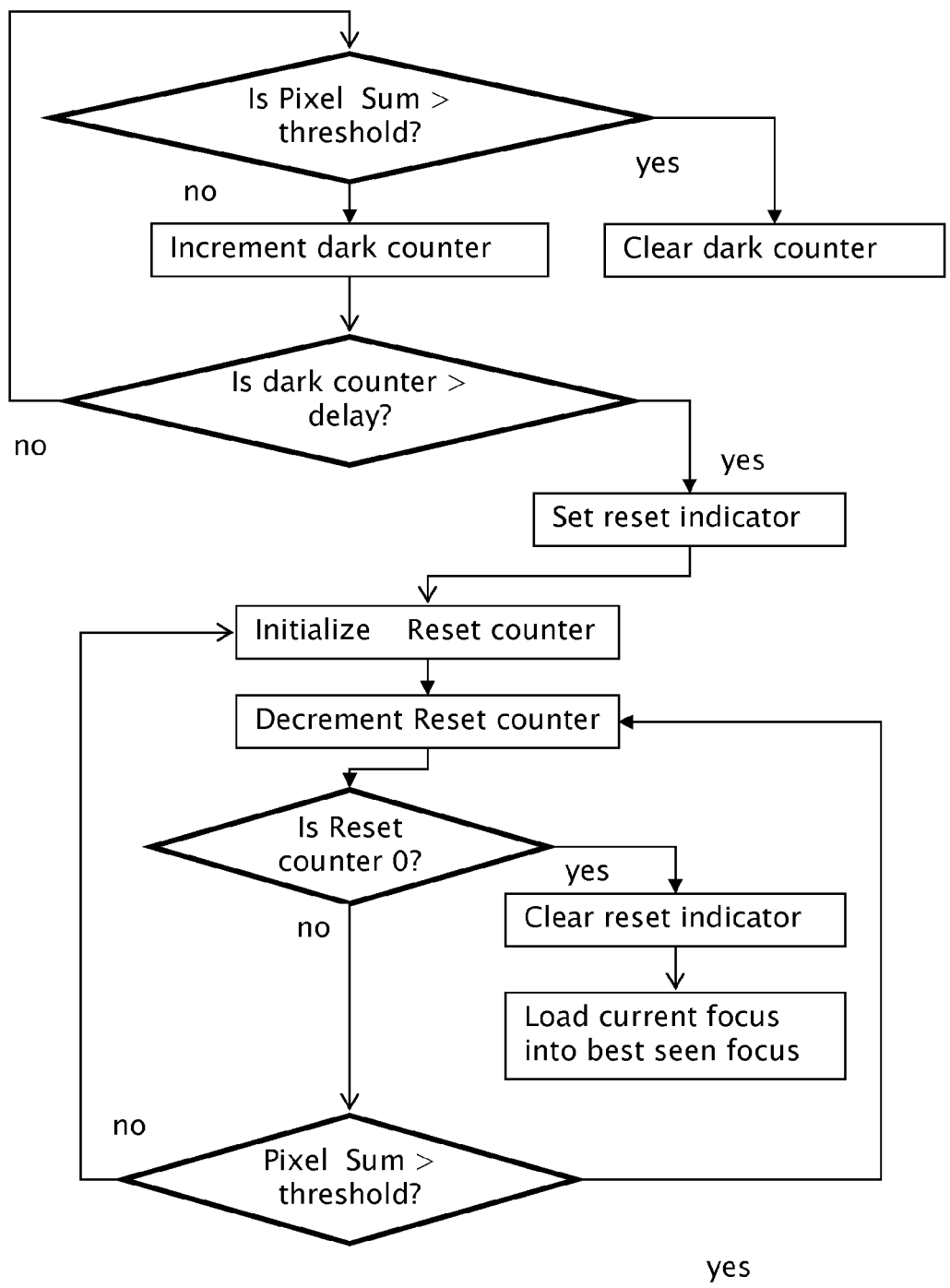
FIG. 5 is a flowchart.

Referring now to FIG. 5, the flowchart illustrates a method for restarting the focus process based on the installer shielding the lens for a period of time. The interface circuit receives a sum of pixel values from the focus circuit. If the sum is below a defined threshold and the camera is in focusing mode, the dark counter is incremented. If sequential frames are below the threshold the dark counter continues to be incremented until the count exceeds a specified period. The operator is cued that the camera has entered focus reset state, and removes the lens shading. Once the camera has detected a return to normal lighting conditions, the reset timer is initiated to allow the camera adjustment circuits to stabilize. When the reset timer has expired the camera is returned to the normal focus mode specified above.

Figure 6:
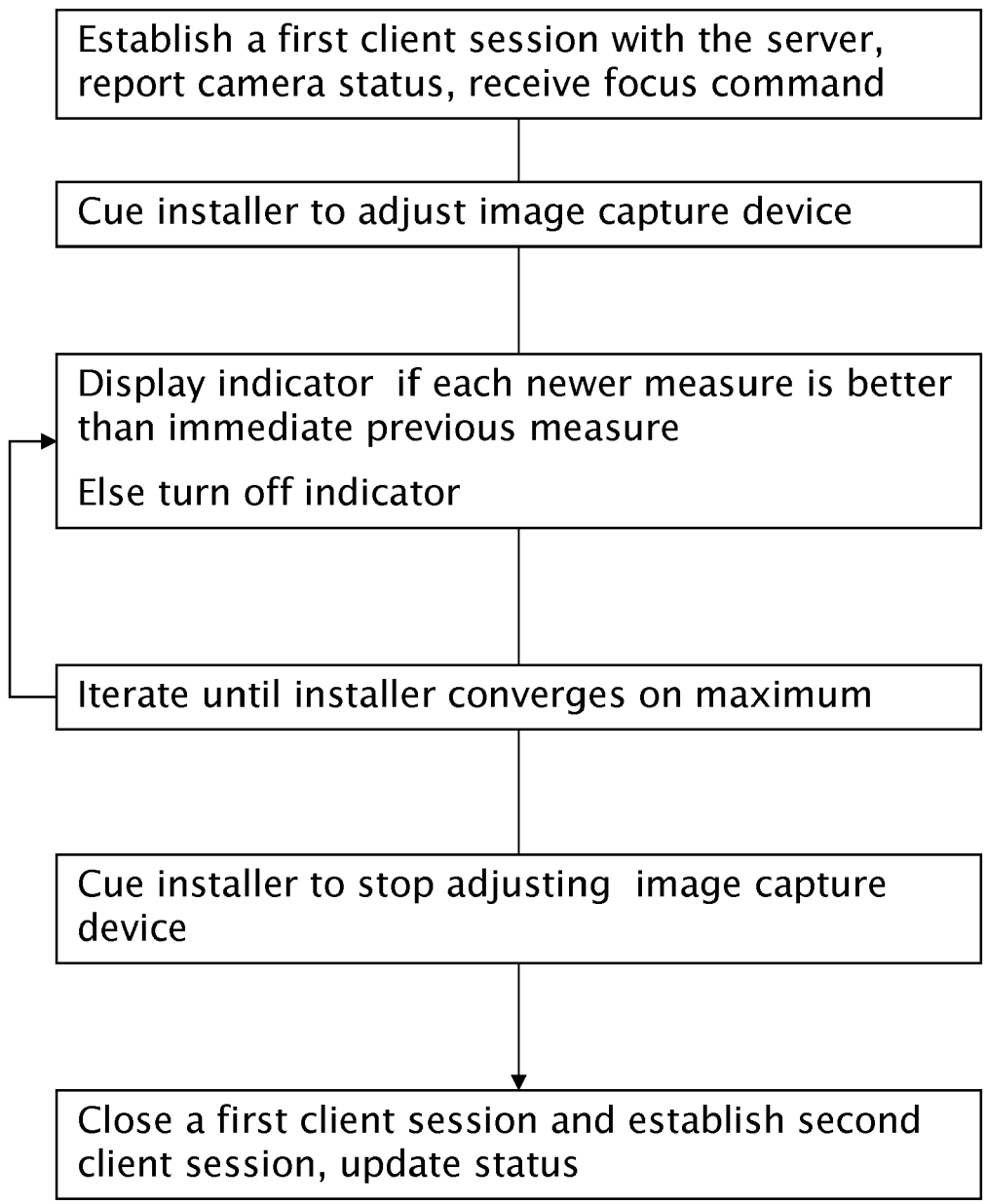
FIG. 6 is a flowchart.
Figure 7:
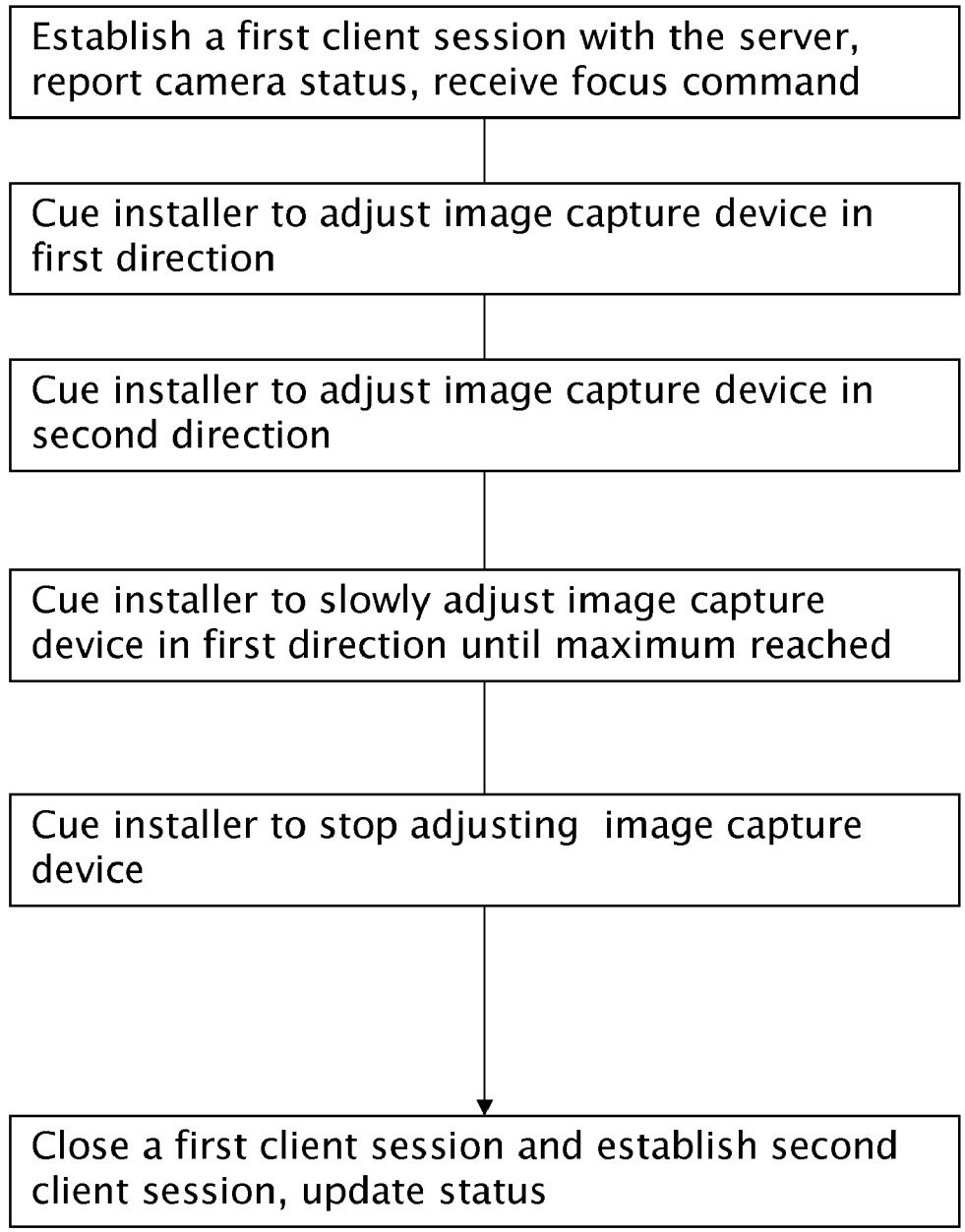
FIG. 7 is a flowchart.

Referring now to FIG. 6-7, the flowcharts illustrate embodiments of methods of operating the apparatus, illustrates the external commands and controls into and out of the apparatus. The apparatus connects to a server as a client to report status and receive commands. In this mode of operation it receives a focus command. It cues the installer to initiate adjustment of the image capture device in an embodiment using an audio tone in an embodiment using a visual display such as an LED as a non-limiting example of a functional equivalent. In an embodiment, an LED is lit as long as each current focus is also the best ever seen. When the best focus has passed, the LED is extinguished. In an embodiment an LED indicates a positive slope i.e. improving quality across the most recent frames. In an embodiment the LED is associated with arrow pointing clockwise or counterclockwise. The installer adjusts the focus gradually in one direction. When the adjustment has reached a point where the focus values are clearly decreasing, the installer is cued to adjust the focus in the other direction. When focus is clearly decreasing the installer is cued to reverse the focus direction. By iterating the process, optimal focus is achieved within the tolerance of the indicator method. The number of iterations depend primarily on the care and speed of the installer's adjustments in accordance with the cues. The first client session is ended and the second client session is started to report status of commands to the camera server.

Figure 8:
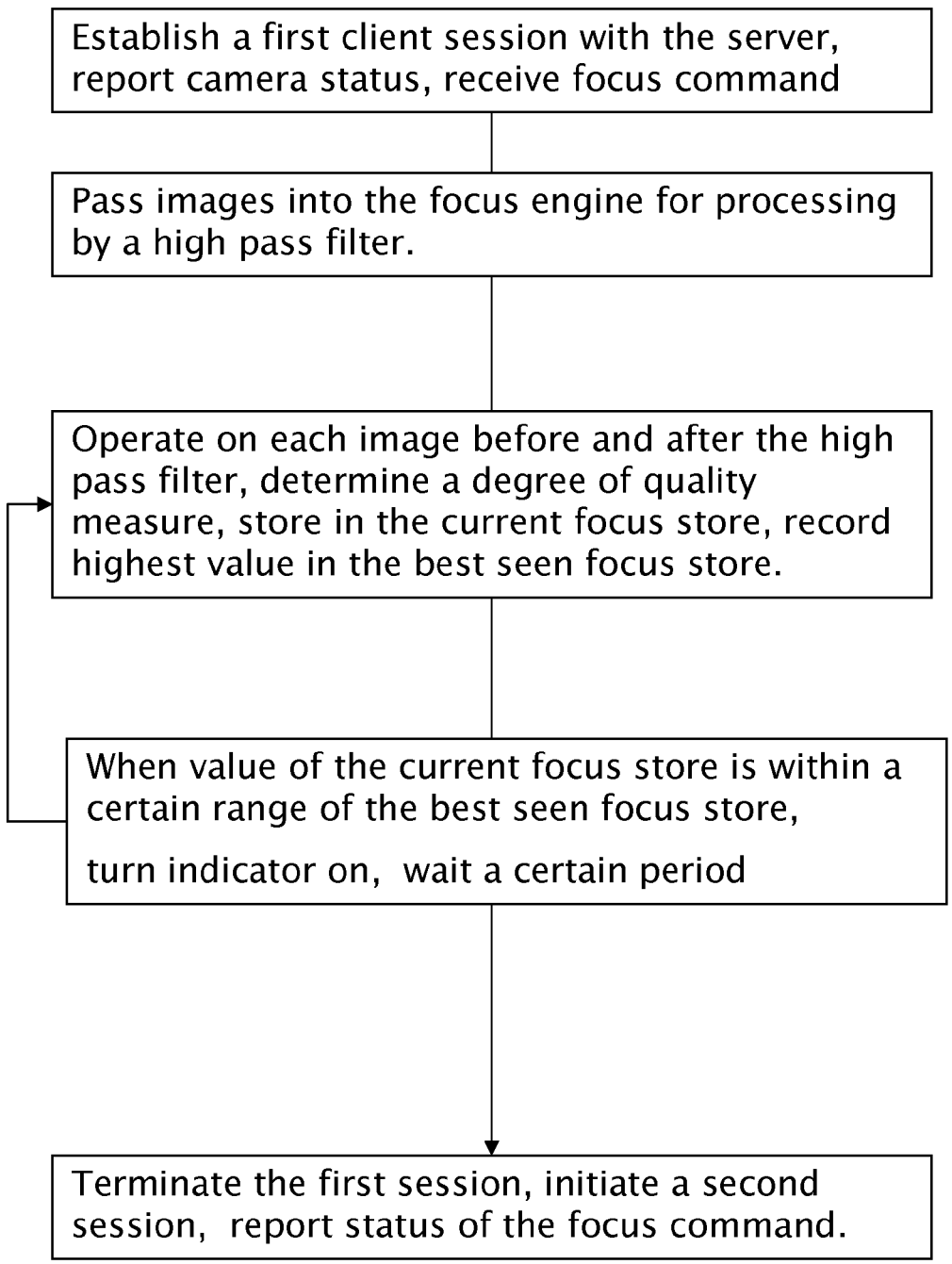
FIG. 8 is a flowchart.
Figure 10:
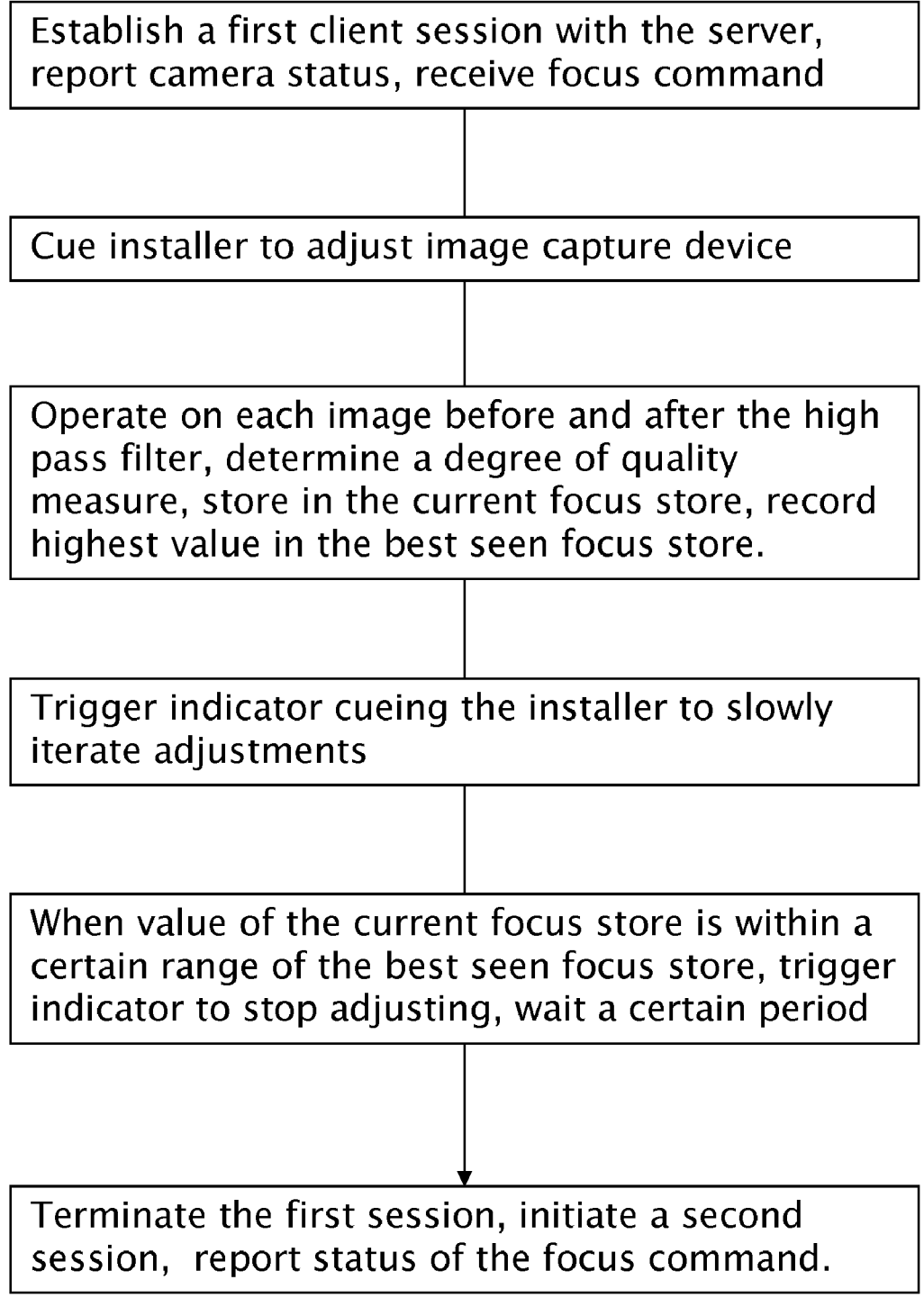
FIG. 10 is a flowchart.

Referring now to FIGS. 8-10, the flowcharts illustrate embodiments of methods of operating a claimed apparatus. In an embodiment, a client circuit establishes a first session with a server to the network interface, reports status, and receives a focus command. A user interface circuit triggers an indicator cueing the installer to adjust the image capture device. Images are passed into the focus engine for processing by a high pass filter. A comparison circuit operates on each image before and after the high pass filter to determine a degree of quality measure which is stored in the current focus store. The highest value of the degree of quality measure is recorded in the best seen focus store. When the value of the current focus store and is within a certain range of the value of the best seen focus store, the user interface triggers an indicator to stop adjusting the image capture device. The client circuit terminates the first session and initiates a second session, and reports the status of the focus command.

The present invention broadly discloses an internet-based digital camera comprising
  means to switch between normal and optimization modes,
  means to detect relative quality, and
  means to provide feed back to a user on the relative quality,
    whereby the user is cued to optimize quality within a tolerance range,
  wherein means are electronic circuits and processors adapted by software.

In an embodiment of the camera, said means to switch between normal and optimization modes comprises
  a network interface,
  a client circuit to establish a session with a server,
  a command receiving circuit to accept a command to focus the camera.

In an embodiment of the camera, said means to switch between normal and optimization modes comprises
  a public private key encryption circuit to authenticate a command received from a server is an authorized server for the camera as a client.

In an embodiment of the camera, said means to switch between normal and optimization modes comprises a mechanical/magnetic/radio frequency/optical activated switch coupled to the exterior of the camera associated with a key.

In an embodiment of the camera, said means to switch between normal and optimization modes comprises an image recognition circuit coupled to the digital image capture device and state machine logic.

In an embodiment of the camera, said means to switch between normal and optimization modes comprises a matrix code reader circuit coupled to the digital image capture device.

In an embodiment of the camera, said means to switch between normal and optimization modes comprises a server circuit within the camera receiving an input value from a client circuit.

In an embodiment of the camera, said means to switch between normal and optimization modes further comprises a circuit to energize a human sensible indicator which distinguishes between normal and optimization modes.

In an embodiment of the camera, means to detect relative quality comprises
  a first delay device and a second delay device 310 and 320;
  a times negative two scaler circuit 330;
  a three input summer circuit 340;
  a focus accumulator circuit 350;
  a pixel sum accumulator circuit 360; and
  a ratio circuit 370.

In an embodiment of the camera, said means to provide feed back to a user on the relative quality comprises: at least one indicator which inform a user of a certain next action to take.

In an embodiment of the camera, said means to provide feed back to a user on the relative quality comprises: an indicator to manipulate a lens in a certain direction.

In an embodiment of the camera, said means to provide feed back to a user on the relative quality comprises: an indicator of relative magnitude variable by the measure of quality achieved.

In an embodiment of the camera, said means to provide feed back to a user on the relative quality comprises: an indicator of proximity to a maximum value of quality.

CONCLUSION

The present invention comprises a user interface circuit, comprising a current focus store and a best seen focus store coupled to
  a circuit to determine when the difference between the current focus store value and the best seen focus store value is less than a certain range,
  wherein the best seen focus store is a latch recording the highest value of the current focus store for all adjustments of the digital image capture device; and
  a focus engine circuit coupled to the adjustable digital image capture device and coupled to the user interface circuit, comprising
    a high pass filter coupled to the adjustable digital image capture device and
    a comparison circuit coupled to the input of the high pass filter and to the output of high pass filter, and
    means for storing the output of the comparison circuit into the current focus store,
  whereby the high pass filter detects the sharpness of edges and when compared with a sum of the same image provides a degree of quality measure; and the adjustable digital image capture device coupled to the user interface circuit.

The apparatus further comprises an indicator that degree of quality measure is improving as the installer has adjusted the digital image capture device.

The apparatus further comprises
a network interface and
client circuit for to
   establish a client session with a server,
   report status of the apparatus, and
   receive a command to focus the apparatus.

The apparatus further comprises
an encryption circuit coupled to the digital image capture device and
no analog port provides access to any image captured on the apparatus.

The apparatus further comprises
a circuit for determining when the installer wishes to restart the focus process,
a circuit for detecting a sequence of dark frames as indication of desire to restart the process,
an indicator reset circuit has been activated, and
an indicator reset circuit has been deactivated.

The apparatus further comprising
an encryption circuit coupled to the digital image capture device and
no local connection provides access to an unencrypted image.

It is particularly pointed out that the focusing process for each camera occurs without the installer viewing the camera image captured by the camera. It is particularly pointed out that the focusing process for each camera is accomplished without the latency of sending an image both to and from a server on a wide area network. The present invention is easily distinguished from conventional surveillance cameras by the absence of an analog port which would allow unauthorized viewers to see the camera images on a video monitor. The present invention is easily distinguished from conventional surveillance cameras by the encryption of the digital image emitted from the network interface which effectively denies access to anyone with a personal computer to the camera images. The present invention is easily distinguished from conventional surveillance cameras by enabling installation without carrying instrumentation up and down ladders. Means are as follows.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

What is claimed is:

1. An apparatus comprising:
an installer indicator device;
an adjustable image capture device;
a focus engine circuit;
a user interface circuit, the focus engine circuit coupled to the adjustable image capture device, the user interface circuit coupled to the focus engine circuit and to the installer indicator device, whereby
the installer indicator device is controlled by the user interface circuit to cue an apparatus installer to manually adjust the adjustable image capture device or to stop manually adjusting the adjustable image capture device;
a pixel sum accumulator;
a pixel sum comparator;
a dark counter and comparator;
a reset counter and comparator; and
control logic circuits, the pixel sum comparator coupled to the pixel sum accumulator, and coupled to the dark counter and comparator, whereby the dark counter is enabled to count while the pixel sum is not above its threshold, and the dark counter is reinitialized while the pixel sum is above its threshold, the dark counter and comparator further couples to the installer indicator device and
a reset counter and comparator, whereby the installer indicator device displays a reset state for a fixed period following initialization of the reset counter when the dark counter has detected a maximum delay, the reset counter is further coupled to the installer indicator device and to
a best seen focus store, for to clear the reset state display and to reinitialize the best seen focus store,
whereby a focus process may be initialized or reinitialized by an installation technician without access to a server or to a network.

2. The apparatus of claim 1 further comprising a network interface, whereby the apparatus receives a focus command transmitted by a server coupled through a public network to the apparatus and wherein the apparatus does not have a locally accessible port to view images.

3. The apparatus of claim 2 further comprising:
a client circuit, coupled to the network interface, wherein the client circuit comprises a processor adapted to initiate a first session with a server, the first session comprising a first hyper text transfer protocol connection to request a command and subsequently to terminate the first session and initiate a second session.

4. The apparatus of claim 3 wherein the client circuit comprises: a processor adapted to initiate a first hyper text transfer protocol post method connection to a server, to transfer as least one video image transfer encoded in chunks, to report status of the camera and of a previously received command.

5. An apparatus comprising:
an installer indicator device;
an adjustable image capture device;
a focus engine circuit; and
a user interface circuit, the focus engine circuit coupled to the adjustable image capture device, the user interface circuit coupled to the focus engine circuit and to the installer indicator device, whereby
the installer indicator device is controlled by the user interface circuit to cue an apparatus installer to manually adjust the adjustable image capture device or to stop manually adjusting the adjustable image capture device;
a first delay device and
a second delay device;
a times negative two scaler circuit;
a three input summer circuit;
a focus accumulator circuit;
a pixel sum accumulator circuit; and
a ratio circuit, the ratio circuit coupled to the focus accumulator circuit and the pixel sum accumulator circuit for to determine a current focus value for each frame of the adjustable image capture device, the first delay device and the second delay device coupled in series between the circuit input and the pixel sum accumulator circuit, the times negative two scaler circuit coupled between the first delay device and the three input summer circuit, the three input summer circuit further coupled to the second delay device and the circuit input and further coupled to the focus accumulator circuit.

6. An apparatus comprising:
an installer indicator device;
an adjustable image capture device;
a focus engine circuit; and
a user interface circuit, the focus engine circuit coupled to the adjustable image capture device, the user interface circuit coupled to the focus engine circuit and to the installer indicator device, whereby
the installer indicator device is controlled by the user interface circuit to cue an apparatus installer to manually adjust the adjustable image capture device or to stop manually adjusting the adjustable image capture device,
wherein the installer indicator device comprises at least one electrically operable visible output device, and
wherein the user interface circuit comprises
a current focus value store,
a best seen focus store,
a latch control, and
an approximate equality circuit; the approximate equality circuit coupled to the current focus value store and the best seen focus store, and further coupled to the installer indicator device, for to determine and indicate to the installer the condition that the current focus is within a range of the best seen focus, the latch control coupled to the current focus value store and the best seen focus store, for to latch the current focus value into the best seen focus store on the condition that the best seen focus is less than the current focus value, and the current focus value store coupled to the ratio device for to receive a degree of quality measure for each frame.

7. The apparatus of claim 6 wherein the installer indicator device comprises
a plurality of electrically operable visible output devices, and wherein the approximate equality circuit comprises:
a fine bit mask having at least one least significant bit,
a gross bit mask having at least two significant bits, and
logic circuits, whereby the installer indicator device indicates a first state of the current focus value being within a range of the best seen focus and a second state of the current focus value being substantially equal to the best seen focus.

8. An apparatus comprising
a user interface circuit, the user interface circuit coupled to and controlling a first indicator to start adjusting or to stop adjusting an adjustable digital image capture device, and coupled to and controlling a second indicator of improving or not improving measure of quality;
a current focus store, and
a best seen focus store, coupled to
a circuit to determine when the difference between the current focus store value and the best seen focus store value is less than a certain range, wherein the best seen focus store comprises
a latch recording the highest value of the current focus store for all adjustments of the digital image capture device; and
a focus engine circuit coupled to the adjustable digital image capture device and coupled to the user interface circuit, said focus engine circuit comprising
a high pass filter coupled to the adjustable digital image capture device and
a comparison circuit coupled to the input of the high pass filter and to the output of high pass filter, and
means for storing the output of the comparison circuit into the current focus store, whereby the high pass filter detects the sharpness of edges and when compared with a sum of the unfiltered same image provides a degree of quality measure; and
the adjustable digital image capture device coupled to the user interface circuit.

9. The apparatus of claim 8 further comprising
a network interface and
a client circuit for to establish a client session with a server, report status of the apparatus, and receive a command to focus the apparatus.

10. The apparatus of claim 8 further comprising
an encryption circuit coupled to the digital image capture device and
wherein no local connection on the apparatus provides access to an unencrypted image.

11. A method for operation of an Internet-based camera apparatus, the method comprising:
establishing a first client session with a server through a network interface coupled to a public wide area network;
transmitting camera status;
receiving a command from the server to focus the camera;
cueing an installer through an indicator to begin adjusting a digital image capture device, cueing said installer through said indicator to stop adjusting said digital image capture device, and concluding said first client session and transmitting a camera status and a status on the command to focus the camera in a second client session.

12. The method of claim 11 further comprising enabling a focus mode by receiving a pattern presented to the digital image capture device of the Internet-based camera apparatus.

13. The method of claim 11 wherein cueing comprises controlling a first visual indicator and a second visual indicator to illuminate in a certain pattern wherein a certain pattern comprises one of blinking at a first rate of speed, blinking at a second rate of speed, illuminated or not illuminated, independently for each visual indicator.

14. The method of claim 11 further comprising zeroing stored values; and restarting a camera focus sequence, on the conditions that a command to focus the camera is valid and no image has been captured for a certain period.

15. An Internet-based camera apparatus comprising:

a network interface whereby a client session may be established with a server to transmit status and request commands, at least one output indicator whereby an installer receives feedback on his recent inaction or action, a user interface driver circuit coupled to the at least one output indicator and further coupled to a focus engine circuit, the focus engine circuit coupled to a digital image capture device and further coupled to the network interface and to the user interface driver circuit, wherein the focus engine circuit comprises an image processing high pass filter coupled to a focus accumulator circuit;

a raw pixel sum accumulator circuit coupled to an unfiltered video frame pixel input of the focus engine circuit; and a ratio circuit coupled to both the focus accumulator circuit and to the raw pixel sum accumulator which compares accumulated raw image data and accumulated filtered image data to determine an output value for the focus engine circuit.

16. The Internet-based camera apparatus of claim 15 further comprising means for indicating that a current focus is within 5% of the best seen focus and means for indicating that a current focus is within 1% of the best seen focus.

17. The Internet-based camera apparatus of claim 15 further comprising means for determining a degree of quality measurement, means for storing the degree of quality measurement, and means for comparing a later degree of quality measurement with a previous degree of quality measurement without display of either measurement value in an output indicator.

* * * * *